(12) United States Patent
Airoldi

(10) Patent No.: US 9,410,532 B2
(45) Date of Patent: Aug. 9, 2016

(54) COOLING ARRANGEMENT

(71) Applicant: SIEMENS AKTIENGESELLSCHAFT, München (DE)

(72) Inventor: Giovanni Airoldi, Brande (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/494,769

(22) Filed: Sep. 24, 2014

(65) Prior Publication Data

US 2015/0211490 A1 Jul. 30, 2015

(30) Foreign Application Priority Data

Jan. 29, 2014 (EP) .................................. 14153084

(51) Int. Cl.
| | |
|---|---|
| *H02K 9/00* | (2006.01) |
| *F03D 9/00* | (2016.01) |
| *H02K 9/02* | (2006.01) |
| *F03D 11/00* | (2006.01) |
| *F03D 11/02* | (2006.01) |
| *H02K 1/00* | (2006.01) |

(Continued)

(52) U.S. Cl.
CPC ................ *F03D 9/002* (2013.01); *F03D 11/00* (2013.01); *F03D 11/028* (2013.01); *H02K 1/00* (2013.01); *H02K 5/20* (2013.01); *H02K 7/183* (2013.01); *H02K 9/02* (2013.01); *F05B 2240/33* (2013.01); *F05B 2260/20* (2013.01); *F05B 2260/2241* (2013.01); *Y02E 10/721* (2013.01); *Y02E 10/722* (2013.01); *Y02E 10/725* (2013.01); *Y02T 50/675* (2013.01)

(58) Field of Classification Search
CPC ........................................................ H02K 9/00
USPC ............................................................ 290/55
See application file for complete search history.

(56) References Cited

U.S. PATENT DOCUMENTS

| | | | |
|---|---|---|---|
| 7,808,149 B2 | 10/2010 | Kleinlercher | |
| 8,847,422 B2 * | 9/2014 | Holm | ................... F03D 7/0204 290/55 |
| 2001/0035651 A1 | 11/2001 | Ikeda | |

(Continued)

FOREIGN PATENT DOCUMENTS

| | | | | |
|---|---|---|---|---|
| CN | 202749924 U | * | 2/2013 | |
| DE | 19636591 A1 | * | 3/1998 | .............. F03D 9/002 |

(Continued)

OTHER PUBLICATIONS

Extended European Search Report for European Application No. 14153084.0, mailed on Jun. 6, 2014.

*Primary Examiner* — Joseph Waks
(74) *Attorney, Agent, or Firm* — Schmeiser, Olsen & Watts, LLP

(57) ABSTRACT

A cooling arrangement configured for use with a direct-drive wind turbine with an outside rotor carrying a plurality of magnets, which cooling arrangement includes a number of exterior cooling elements arranged about an exterior of the outside rotor, wherein a cooling element is configured to guide a cooling airflow over the outside rotor and to transfer heat from the plurality of magnets to the cooling airflow, is provided. A direct-drive wind turbine including an outside rotor carrying a plurality of magnets, and a cooling arrangement for transferring heat from the magnets to an exterior cooling airflow, is further provided.

19 Claims, 3 Drawing Sheets

(51) Int. Cl.
*H02K 5/20* (2006.01)
*H02K 7/18* (2006.01)

(56) References Cited

U.S. PATENT DOCUMENTS

| | | | |
|---|---|---|---|
| 2006/0113804 A1 | 6/2006 | Costin | |
| 2007/0210656 A1* | 9/2007 | Lafontaine | H02K 3/50 310/58 |
| 2011/0140444 A1* | 6/2011 | Winter | F03D 11/00 290/55 |
| 2013/0300124 A1* | 11/2013 | Chobot | F03D 9/002 290/55 |
| 2014/0346781 A1* | 11/2014 | Airoldi | F03D 9/002 290/1 B |
| 2015/0010402 A1* | 1/2015 | Rohden | H02K 7/1838 416/95 |

FOREIGN PATENT DOCUMENTS

| | | | | |
|---|---|---|---|---|
| DE | EP 2477311 A1 * | 7/2012 | | H02K 1/20 |
| DK | WO 2010085963 A2 * | 8/2010 | | F03D 11/00 |
| EP | 1081376 A1 | 3/2001 | | |
| EP | 1837519 A2 | 9/2007 | | |
| EP | 2187506 A1 | 5/2010 | | |
| EP | 2354542 A1 | 8/2011 | | |
| EP | 2381560 A1 | 10/2011 | | |
| EP | 2381561 A2 | 10/2011 | | |
| EP | 2445087 A1 | 4/2012 | | |
| EP | 2498376 A1 | 9/2012 | | |
| EP | 2498377 A1 | 9/2012 | | |
| EP | 2498386 A1 | 9/2012 | | |
| WO | WO 0121956 A1 | 3/2001 | | |
| WO | WO 2012120485 A2 | 9/2012 | | |
| WO | WO 2013104777 A2 | 7/2013 | | |

\* cited by examiner

COOLING ARRANGEMENT

CROSS-REFERENCE TO RELATED APPLICATIONS

This application claims priority to EP Application No. 14153084, having a filing date of Jan. 29, 2014, the entire contents of which are hereby incorporated by reference.

FIELD OF TECHNOLOGY

The following relates to a cooling arrangement for a direct-drive wind turbine with an outside rotor, and a wind turbine with such a cooling arrangement.

BACKGROUND

In a direct-drive wind turbine, the rotor is usually realised as an outside rotor, i.e. the rotor is arranged on the outside and the stator is arranged on the inside so that the rotor encloses the STATOR. Here, the "rotor" is to be understood as the rotating component of the generator. The rotor is directly connected to the hub, so that when the hub rotates, the rotor rotates at the same rate. Usually, the rotor is also the field of the generator and the stator is the armature, i.e. the rotor usually bears the magnets while the stator bears the coils or windings. A housing of the rotating rotor can interface with a stationary canopy of the wind turbine by means of a labyrinth seal, so that the rotor is free to rotate, while an interior region of the canopy is sealed from the outside.

To obtain a high efficiency in a generator of such a direct-drive wind turbine, permanent magnets may be used. During operation of the generator, the stator windings become very hot, and heat convection and radiation given off by the windings acts to heat the magnets. At high temperatures, a permanent magnet becomes demagnetized. Therefore, some generator designs are based on the use of sintered permanent magnets made to include a quantity of Dysprosium, which ensures that the magnet does not lose its magnetization at high temperatures. However, such magnets are significantly more expensive. Therefore, much effort is invested in cooling arrangements with the intention of protecting the more economical permanent magnets from high temperatures.

In outside stator generator designs, the stator is on the outside and can give off heat to the ambient, air while the magnets of the inside rotor can be directly cooled by an inner cooling circuit of the wind turbine. Many prior wind turbines use some kind of cooling arrangement that involves a cooling airflow directed over the heat-generating parts. A forced cooling is more efficient, and such cooling arrangements may involve several fans for blowing and/or drawing air over critical parts in the interior of the generator. However, the cooling effect of such cooling arrangements is usually limited to an interior region.

In a direct-drive wind turbine with outer rotor, the magnets cannot be accessed by such an inner cooling circuit. Prior art direct-drive outer rotor wind turbines therefore rely on convection cooling to cool the rotor as it rotates through the surrounding air. However, the cooling effect is limited. A direct cooling of the magnets is made difficult since these are mounted in the outside rotor, and access to the magnet surfaces is limited to a very narrow air-gap between the magnets and the windings on the inside stator. Therefore, prior art cooling arrangements are characterised by a poor performance with regard to their ability to cool the permanent magnets in the outside rotor of a direct-drive wind turbine. Furthermore, in an air-cooled system, the stator windings give off heat to an airflow directed over the windings. This heated air in turn gives off heat to the magnets, which are already heated by the heat radiation given off by the windings, thereby worsening the problem.

SUMMARY

An aspect relates to an improved cooling arrangement that overcomes the problems mentioned above.

According to embodiments of the invention, the cooling arrangement is realised for use with a direct-drive wind turbine with an outside rotor carrying a plurality of magnets, and comprises a number of exterior cooling elements arranged about an exterior of the outside rotor to guide a cooling airflow over the outside rotor and to transfer heat from the magnets to the cooling airflow.

In a direct-drive wind turbine, as described above, the outside rotor carries the magnets. These are therefore arranged very close to the outer surface of the outside rotor. Heat transferred to the magnets from the inside stator is transferred through the magnets to the outer surface of the outside rotor. An advantage of the rotor cooling arrangement is that a cooling airflow can be directed over the outside surface of the rotor by the cooling elements to absorb the heat very effectively and to transport it away from the magnets. This very effective heat transfer ensures that the magnets are less likely to overheat, and they are less likely to become demagnetized, thus favourably prolonging the useful lifetime of the rotor and maintain the efficiency of the generator.

For structural stability, the outside rotor generally comprises a cylindrical supporting structure with interior slots into which the magnets are mounted. The supporting structure is generally made of a strong material such as steel. In this case, the heat transfer to the exterior is improved even further, since metal transfers heat very effectively and the cooling airflow will therefore be even more effective in transferring heat away from the magnets.

According to embodiments of the invention, the direct-drive wind turbine comprises an outside rotor carrying a plurality of magnets, and a rotor cooling arrangement according to embodiments of the invention for transferring heat from the magnets to an exterior cooling airflow.

An advantage of the direct-drive wind turbine according to the invention is that the magnets are very effectively protected from overheating. Particularly when the magnets deployed in the generator are permanent magnets, these are protected from becoming demagnetized, so that the efficiency of the wind turbine is kept at a favourably high level.

According to embodiments of the invention, the method of cooling an outside rotor of a direct-drive wind turbine—which outside rotor carries a plurality of magnets—comprises the steps of arranging a number of cooling elements about an exterior of the outside rotor; and guiding a cooling airflow over the outside rotor to transfer heat from the magnets to the cooling airflow.

With the method according to embodiments of the invention, the efficient cooling can be achieved without having to arrange ducts or pipes for a cooling fluid about the rotor. An advantage of the method according to embodiments of the invention is that a very effective cooling of the outer rotor and therefore also of the magnets can be achieved with comparatively little effort and in a favourably economical manner.

Particularly advantageous embodiments and features of embodiments of the invention are given by the dependent claims, as revealed in the following description. Features of different claim categories may be combined as appropriate to give further embodiments not described herein.

Other elements such as the rotor blades and the hub to which the rotor blades are mounted are sometimes regarded collectively as a rotor, since these elements are all connected, essentially as a single entity, and therefore also rotate at the same speed. However, to avoid confusion, the term "rotor" in the context of the present application is used to refer to the rotating field of the generator. Without restricting embodiments of the invention in any way, the cooling arrangement may be referred to as a 'rotor cooling arrangement', an 'outside rotor cooling arrangement' or a 'magnet cooling arrangement' since the purpose of the cooling arrangement according to embodiments of the invention is to cool the magnets by drawing heat away from the outside rotor.

The cooling element(s) of the magnet cooling arrangement can be realised in any suitable manner. Furthermore, any number of cooling elements can be used. In a particularly preferred embodiment of the invention, a cooling element comprises a fin extending outward from the surface of the rotor. Such an embodiment comprises a plurality of fins, for example arranged equidistantly over the outside surface of the rotor. Since a fin has direct contact to the outside rotor and extends outward, it can effectively transfer heat originating from the magnets—from the rotor outside surface in an essentially outward direction. The fin takes up heat from the rotor and gives it off to the surrounding air in the manner of a heat exchanger. The surface area of a fin and the material from which it is made can be chosen to obtain a favourably efficient heat transfer. For example, a fin can be made of a strip of metal that is securely bonded to the outer surface of the rotor, e.g. welded or bolted to the outer surface of a metal rotor housing.

A fin extends from a front end of the rotor (i.e. the hub end) to a rear end of the rotor (in the direction of the canopy). In this way, the fin can act to 'collect' or take up heat from over the length of the rotor.

The outside rotor of a direct-drive wind turbine rotates at the same speed as the rotor blades, as already described above. Therefore, the outside rotor has a rotational velocity. The wind can be assumed to have a direction that is perpendicular to the rotor plane, since the hub of a wind turbine is usually always directed to face directly into the wind. As a result, as air passes over the outside rotor, it will be displaced by the rotation of the outside rotor. In a particularly preferred embodiment of the invention, therefore, a fin is arranged diagonally between the front end and the rear end of the rotor, and a fin angle is determined on the basis of a rated power output of the wind turbine. The 'fin angle' is to be understood as the angle subtended by the fin relative to an edge of the rotor, whereby an 'edge' can be at the front end or at the rear end of the rotor. Generally, a wind turbine is operated to deliver rated power from a certain wind speed, i.e. the minimum wind speed at which the generator reaches its rated power. A certain rotational velocity of the hub (and therefore also of the rotor) is associated with this wind speed. The product of the wind velocity vector and the rotor rotational velocity vector results in a vector that defines an optimal orientation for a fin. A plurality of fins is arranged in parallel at this fin angle about the surface of the rotor. Such a fin arrangement minimizes the pressure loss in an airflow over the outer surface of the rotor, and thereby ensures a maximum airflow over the rotor, since the airflow is guided in its natural trajectory and is therefore less likely to 'break away'. The result is an efficient cooling airflow 'layer' that takes up heat as it passes over the rotor outer surface.

In a further preferred embodiment of the invention, a cooling element comprises a shroud arranged at a distance outward from an outer surface of the rotor and realised to contain and/or direct the cooling airflow over the outer surface of the rotor. In the context of the present embodiments of the invention, a 'shroud' is to be understood as a covering element arranged about the rotor and at a distance outward from the rotor, so that a cooling airflow can pass through a gap or cavity between the rotor housing and the shroud. The shroud can be made of any suitable material, for example fiberglass, aluminum, etc.

Since the fin(s) and the shroud make different contributions to heat transfer from the magnets, in the following, but without restricting the embodiments of the invention in any way, a fin may be referred to as a 'first exterior cooling element' and the shroud may be referred to as a 'second exterior cooling element'.

Various embodiments of the cooling arrangement according to the embodiments of the invention are possible. For example, an embodiment based only the use of fins is possible; an embodiment making use of only a shroud is possible, so that a magnet cooling arrangement according to the embodiments of the invention can comprise a number of first cooling elements and/or a number of second cooling elements. However, a combination involving the use of fins as well as a shroud is preferred, as will be explained in the following.

In a particularly preferred embodiment of the invention, the shroud is realised to at least partially enclose the rotor. For example, the shroud can be a curved body that can be placed about the rotor so that a chamber or gap is defined between the outside surface of the rotor and an inner surface of the shroud. The gap is large enough to allow a cooling airflow to move easily through, and narrow enough to ensure that the airflow is contained between the fins, thereby resulting in a favourable air pressure in the cooling airflow layer.

The shroud can be realised for mounting to the wind turbine in any suitable manner. In one preferred embodiment of the invention, the shroud comprises a rotating shroud portion mounted to the outside rotor. This can be realised as a cylindrical element with a diameter that exceeds the diameter of the rotor housing such that a desired gap remains between the rotor outer housing and the shroud. This cylindrical element is secured to the rotor so that it rotates along with the rotor as one body. Particularly in an embodiment that also makes use of cooling fins to draw heat away from the magnets, the distance between the rotating shroud portion and the outside rotor essentially corresponds to the height of a fin. In such an embodiment, the shroud can also be secured to the outer edges of one or more fins to obtain a satisfactorily stable construction and to encourage the cooling airflow to travel in the channels between adjacent fins. When the shroud is made of a heat conductive material such as metal (e.g. aluminum), fixing it to the fins will make the shroud become an active part of the cooling system, since it will effectively increase the heat exchange area.

In a further preferred embodiment of the invention, the outside rotor cooling arrangement comprises an intake guide for guiding the cooling airflow under the shroud. In the case of a partial or complete cover arranged about the rotor, the intake guide can be realised as an outwardly flared element that serves to guide air into the relatively narrow gap between rotor and shroud. In this way, air that might otherwise pass over the shroud is compelled to enter the gap, so that a favourable air pressure is maintained in the cooling airflow layer. This can increase the effectiveness of the cooling airflow layer in drawing heat away from the magnets, for example by absorbing heat from the cooling fins and from the outer surface of the rotor.

The cooling airflow layer from between the rotor and shroud is guided in a controlled manner away from the rotor.

Therefore, in an embodiment of the invention, the shroud comprises a stationary shroud portion mounted to a canopy of the wind turbine. Here also, the stationary shroud portion is arranged to leave a gap between it and the canopy. In such an embodiment, the rotor cooling arrangement comprises a suitable interface between the stationary and rotating parts. For example, the shroud portions can be connected by means of a labyrinth seal between the stationary shroud portion and the rotating shroud portion, so that the rotating shroud portion can rotate relative to the stationary shroud portion while ensuring that the cooling airflow remains underneath the shroud.

To increase the effectiveness of the cooling airflow, instead of letting it passively exit from underneath the shroud, in a preferred embodiment of the invention the stationary shroud portion of the cooling arrangement comprises a number of ducts arranged to direct the cooling airflow from under the shroud into an exit channel of an inner cooling circuit of the wind turbine. The stationary shroud portion is realised to act as an interface between a shroud portion over the rotating rotor and the inner cooling circuit of the wind turbine, by incorporating a duct that enters into the body of the canopy, where it can join with a duct or channel of the functionally separate inner cooling circuit. In such an embodiment, any element of the inner cooling circuit that acts to propel air through a channel of the inner cooling circuit will also act on the airflow from the cooling arrangement according to the embodiments of the invention. For example, the inner cooling circuit may comprise an exit channel in which an extractor fan is arranged. This may serve the purpose of actively drawing air from an interior of the canopy, through the stator windings, and out through the exit channel. If the stationary shroud portion of the cooling arrangement according to the embodiments of the invention comprises an inwardly directed duct that 'feeds into' such an exit channel, the extractor fan will also serve to actively draw air from the exterior, into the gap between shroud and rotor housing, and over the surface of the rotor housing. In this way, the effectiveness of the cooling airflow in drawing heat away from the magnets is favourably increased by the 'forced convection' action of the shared fan. Depending on how such an exit channel of the inner cooling circuit is realised, the cooling arrangement according to the embodiments of the invention can comprise one or more such inwardly directed ducts. In such an embodiment, the shroud has the function of a 'manifold', since it directs waste air at an extraction or expelling means. The ducts or connection pipes connecting the manifold or shroud to the exit channel of the inner cooling circuit may be equipped with butterfly valves to control the ratio of heated air from the rotor to heated air from the generator. Alternatively, the ducts can be dimensioned to obtain the desired flow rate.

Different types of cooling requirements may arise during the various stages of operating a wind turbine. For example, before start-up under very cold conditions, it may be desirable to circulate heated air throughout the generator to avoid condensation on the windings and magnets. At this stage, a cooling airflow from the cooling arrangement according to the embodiments of the invention is not required. Instead, the airflow of the inner cooling circuit may be 'recycled' until a minimum desired starting temperature is reached. Sometime after start-up, the windings will be hot and the cooling arrangement according to the embodiments of the invention can then be used to good effect. To prevent the airflow from outside from entering the canopy during a start-up procedure, the cooling arrangement according to the embodiments of the invention comprises a valve such as a butterfly valve arranged in an inwardly directed duct, and such a valve is realised to regulate an air flow into the inner cooling circuit of the wind turbine.

For a wind turbine with an alternative inner cooling circuit, i.e. one which does not comprise such an exit channel, or one in which the exit channel is effectively inaccessible, an alternative way of drawing the cooling airflow away from the rotor housing may be preferred. For example, an alternative embodiment of the cooling arrangement according to the embodiments of the invention comprises an outer exit channel arranged to direct the cooling airflow along the exterior of the wind turbine towards an expelling means. The expelling means may comprise an extractor fan which actively draws or sucks the air through the gap between shroud and rotor, to further increase the effectiveness of the cooling. Alternatively, the expelling means may comprise an outwardly flared end portion so that the difference in pressure between the end portion and the comparatively narrow gap between shroud and rotor housing or canopy is enough to encourage an air flow towards the end portion.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION

Some embodiments will be described in detail, with reference to the following figures, wherein like designations denote like members, wherein.

DETAILED DESCRIPTION

In the diagrams, like numbers refer to like objects throughout. Objects in the diagrams are not necessarily drawn to scale.

Figure 1:
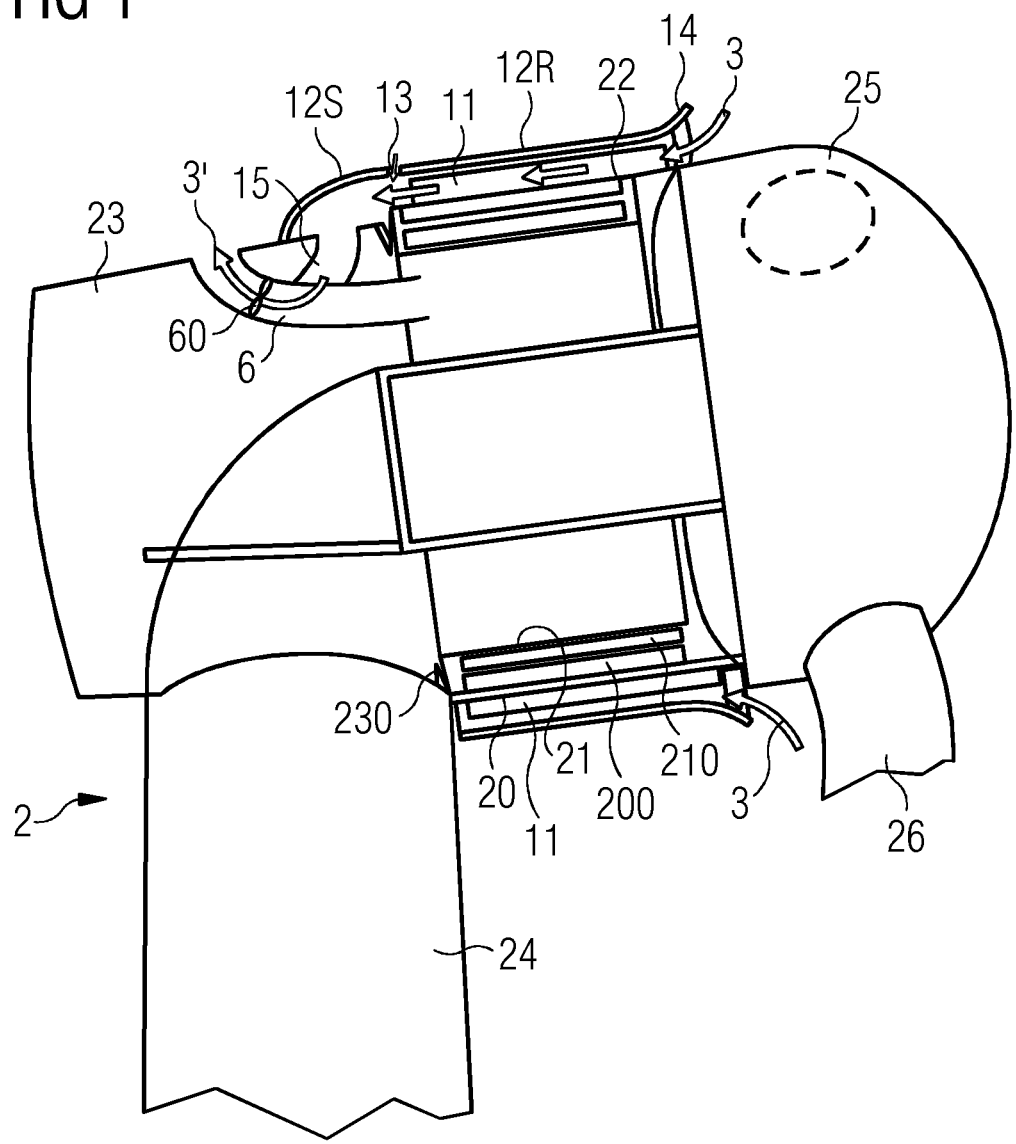
FIG. 1 shows a first embodiment of a cooling arrangement.

FIG. 1 shows a first embodiment of a cooling arrangement 1 according to embodiments of the invention for a direct-drive wind turbine 2 with a generator that has an outer rotor 20 directly connected to a hub 25, and wherein the generator is mounted on a tower 24 and connected to a canopy 23 by means of a labyrinth seal 230 between outer rotor 20 and canopy 23. When wind causes the rotor blades 26 of the wind turbine to rotate, the hub 25 and therefore also the rotor 20 turn at the same rotational speed. During operation of the generator, windings 210 of the inside stator 21 become very hot, causing the magnets 200 to become hot also. The magnets 200 are mounted to the outside rotor 20 and separated from the windings 210 by a narrow air-gap, usually comprising only a few millimeters. Their location makes it difficult to cool them using a conventional interior cooling circuit of the wind turbine 2. Here, the cooling arrangement 1 consists of a shroud 12R, 12S mounted to the exterior of the direct-drive wind turbine 2 so that a rotating shroud portion 12R effectively encloses the outside rotor 20 and so that a cooling airflow 3 can pass directly over a rotor exterior surface 22. The cooling arrangement 1 also comprises a number of fins 11 mounted onto the exterior surface of the rotor 20 and extending outward so that these act to dissipate heat. Because the magnets 200 are mounted so close to the rotor housing, and because the fins are mounted directly to the exterior of the rotor housing, these can very effectively draw heat away from the magnets 200. In this exemplary embodiment, the shroud also has a stationary shroud portion 12S which is connected to the rotating shroud portion 12R by means of a labyrinth seal 13. A duct 15 leads into an exit channel 6 of an inner cooling circuit of the wind turbine 2. In this example, an extractor fan 60 of the inner cooling circuit actively draws heated waste air from the interior of the generator and expels it from the exit channel 6. In this way, heated air 3' from under the rotating shroud portion 12R is also actively drawn away from the rotor 20 and is expelled through the exit channel 6. This arrangement ensures a very effective cooling of the magnets 200 with the cooling airflow 3 over the outside rotor 20.

Figure 2:
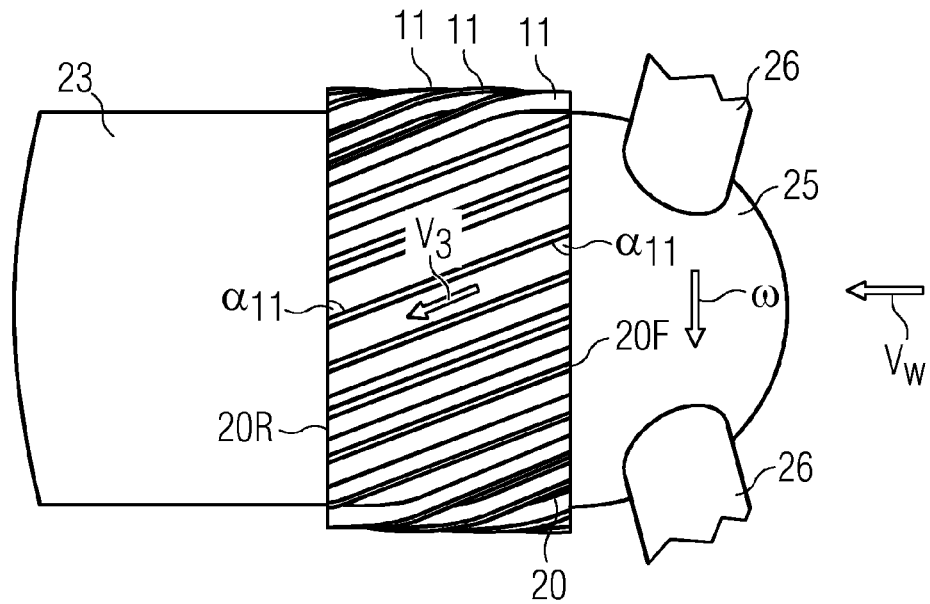
FIG. 2 is a simplified plan view of a portion of the cooling arrangement of FIG. 1.

FIG. 2 is a simplified plan view of an arrangement of fins 11 on the rotor 20 of the wind turbine of FIG. 1. Each fin extends from a front end 20F to a rear end 20R of the rotor 20, and is arranged at a fin angle $\alpha 11$. The fin angle $\alpha 11$ is determined by a rotational velocity $\omega$ of the rotor 20 when the wind turbine is operating at rated power, and this is generally associated with a certain average wind velocity $v_w$. The product v3 of these vectors $\omega$, $v_w$ can be used to derive an optimal fin angle $\alpha 11$ that has essentially the same orientation as the air flow that would normally pass over the rotor. The fins 11 are arranged equidistantly about the rotor 20. A cooling arrangement based only on the cooling effect of the fins 11 may be sufficient to draw heat away from the magnets. However, the cooling airflow 3 (indicated by several arrows between fins 11) may tend to leave the spaces between the fins 11 before reaching the rear end 20R of the rotor 20. Therefore, an embodiment that combines the effective heat dissipation of the fins 11, combined with a shroud 12 to retain the cooling airflow 3 close to the rotor 20 is preferred.

Figure 3:
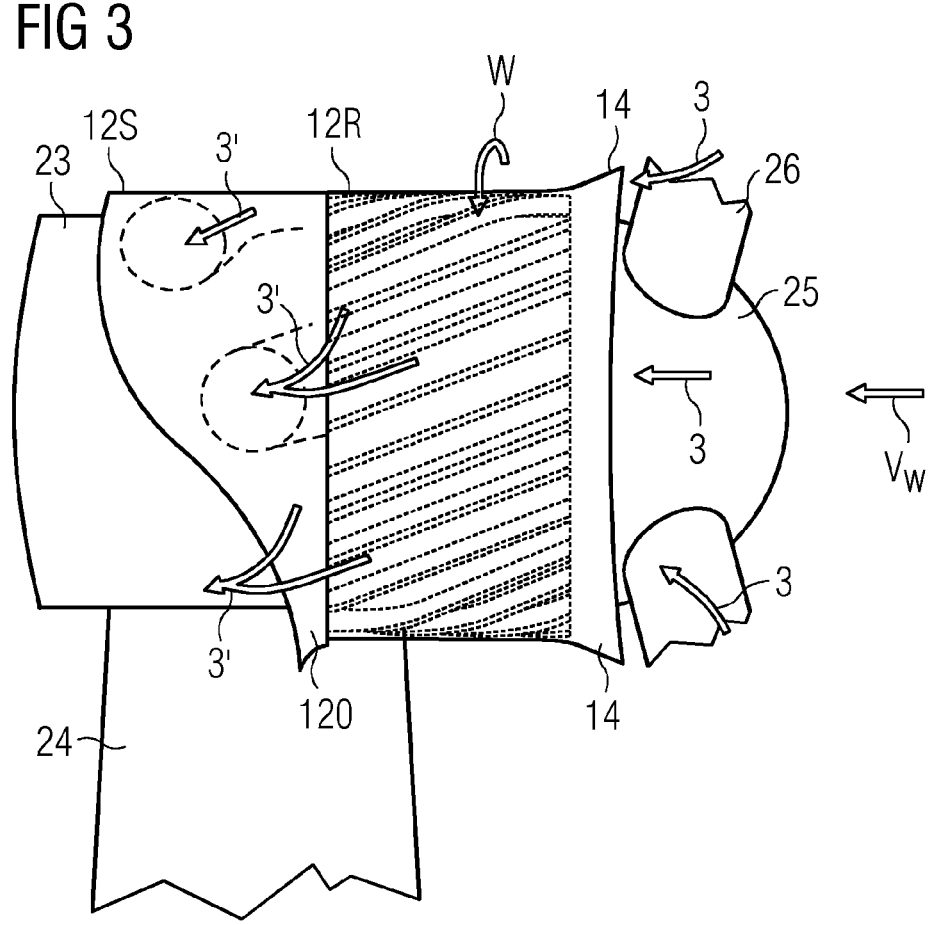
FIG. 3 shows a simplified side view of a portion of a cooling arrangement in a further embodiment.

FIG. 3 shows a simplified side view of a shroud 12R, 12S arranged about the rotor 20 of a wind turbine, similar to the arrangement shown in FIG. 1. In this embodiment, the shroud 12R, 12S comprises a rotating shroud portion 12R, mounted about the rotor 20 so that rotor 20 and this shroud portion 12R rotate as a single unit as indicated in FIG. 1 above. A cooling airflow 3 enters into a space between the rotating shroud portion 12R and the rotor 20, and passes between the fins 11 (indicated by the dotted lines). The cooling airflow 3 is encouraged to enter the rotating shroud portion 12R by an intake guide 14, in this case an outwardly flared region 14 at the front of the rotating shroud portion 12R that increases the catchment area. A stationary shroud portion 12S is arranged over the canopy 23 and has a number of ducts 15, each of which can lead into a channel of an inner cooling circuit of the wind turbine. An extractor fan (not shown) can actively draw the heated air 3' away from the rotor 20, thus encouraging a controlled flow of cooling air 3 over the rotor 20. After passing over the rotor 20, the air now comprises a heated airflow 3' which is drawn into the channels of the inner cooling circuit. The heated air 3' can also escape from under the stationary shroud portion 12S at a location where it is inconvenient to place a duct. In such a region, in this example at a lower canopy level, the stationary shroud portion 12S has an outwardly flared portion 120 that encourages the heated air 3' to escape. Because the shroud in this example connects to a number of waste air exit channels, it may be referred to as a 'manifold'.

Figure 4:
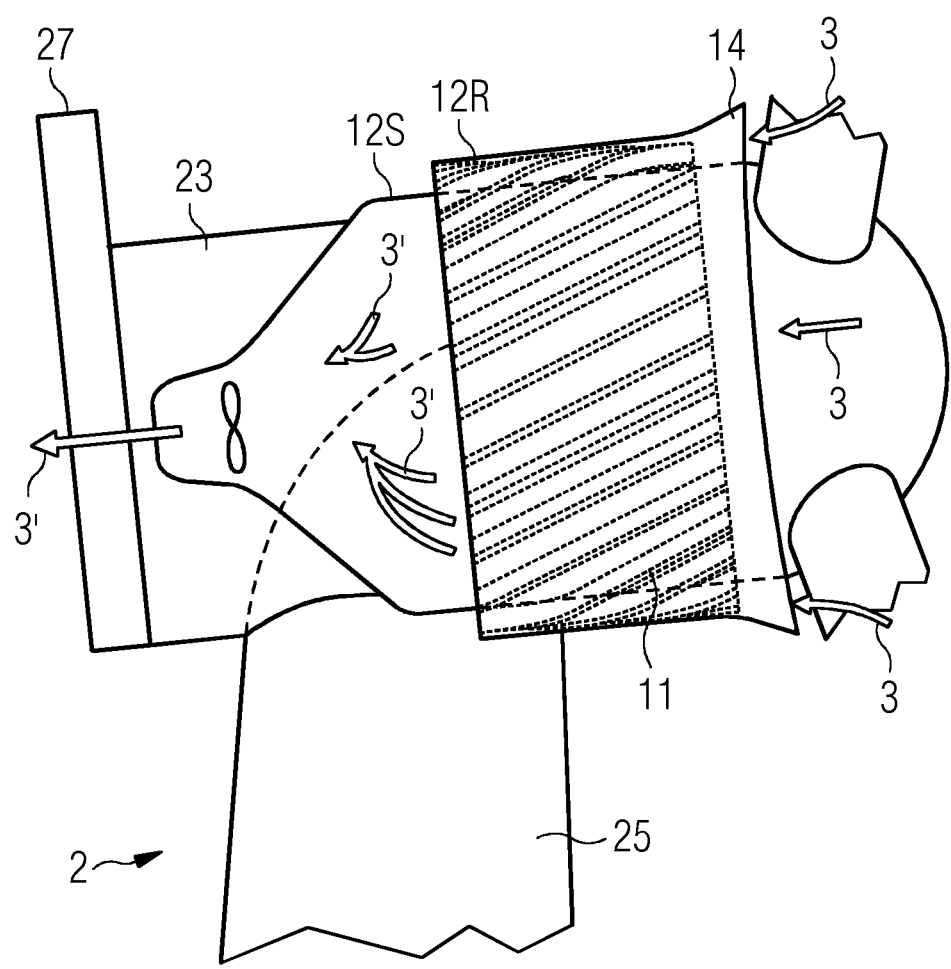
FIG. 4 shows a further embodiment of the cooling arrangement 1.

FIG. 4 shows another embodiment of the cooling arrangement 1 according to embodiments of the invention. In this case, there is no connection to parts of an inner cooling circuit of the wind turbine 2. Instead, the heated air 3' is actively drawn out from under the shroud 12S, 12R by means of an extractor fan 16 located at a convenient position on the outside of the canopy 23. For example, an extractor fan 16 can be arranged at the side of the canopy 23 and towards the rear. This can be a preferred location if the wind turbine 2 also avails of a passive cooler 27 at the rear, since a passive cooler 27 generally extends to a height above top of the canopy 23 but is not wider than the canopy 23. In this way, the heated airflow 3' can be expelled along the side of the canopy 23 without being impeded.

Although the present invention has been disclosed in the form of preferred embodiments and variations thereon, it will be understood that numerous additional modifications and variations could be made thereto without departing from the scope of the invention. For example, in a relatively simple embodiment, the shroud may comprise only a stationary manifold mounted to the canopy and extending also over the rotor. This embodiment might be useful in retro-fitting an existing wind turbine with additional rotor cooling, even if the existing rotor is not equipped with outside cooling fins as described above. The cooling airflow encouraged by the stationary shroud about the rotor—even if it only partially encloses the rotor—may be sufficient to effectively cool the magnets.

For the sake of clarity, it is to be understood that the use of "a" or "an" throughout this application does not exclude a plurality, and "comprising" does not exclude other steps or elements.

The invention claimed is:

1. A cooling arrangement configured for use with a direct-drive wind turbine with an outside rotor carrying a plurality of magnets, which cooling arrangement comprises a number of exterior cooling elements arranged about an exterior of the outside rotor, wherein a cooling element is configured to guide a cooling airflow over the outside rotor and to transfer heat from the plurality of magnets to the cooling airflow, wherein an exterior cooling element comprises a fin mounted directly to an outer surface of the outside rotor and a shroud arranged to direct the cooling airflow over the outer surface of the outside rotor.

2. The cooling arrangement according to claim 1, wherein the cooling element comprises the fin extending outward from the surface of the outside rotor.

3. The cooling arrangement according to claim 2, wherein the fin extends from a front end of the rotor to a rear end of the outside rotor.

4. The cooling arrangement according to claim 3, wherein the fin is arranged diagonally between the front end and the rear end of the outside rotor, and wherein a fin angle is determined on the basis of a rated power output of the wind turbine.

5. The cooling arrangement according to claim 1, wherein the fin comprises a strip of metal that is securely bonded to the outer surface of the outside rotor.

6. The cooling arrangement according to claim 5, wherein the shroud is configured to at least partially enclose the outside rotor.

7. The cooling arrangement according to claim 5, wherein the shroud comprises a rotating shroud portion mounted to the outside rotor.

8. The cooling arrangement according to claim 7, wherein the rotating shroud portion is arranged at a distance outward from the outside rotor, which distance corresponds to the height of a fin.

9. The cooling arrangement according to claim 5, wherein the shroud comprises a stationary shroud portion mounted to a canopy of the wind turbine.

10. The cooling arrangement according to claim 9, comprising a labyrinth seal between the stationary shroud portion and a rotating shroud portion.

11. The cooling arrangement according to claim 5, comprising an intake guide for guiding the cooling airflow under the shroud.

12. The cooling arrangement according to claim 5, comprising a number of inwardly directed ducts arranged to direct the cooling airflow from under the shroud into an inner cooling circuit of the wind turbine.

13. The cooling arrangement according to claim 5, comprising an outtake fan arranged to draw heated air from under the shroud along the exterior of the wind turbine canopy.

14. The direct-drive wind turbine comprising an outside rotor carrying a plurality of magnets, and a cooling arrangement according to claim 1 for transferring heat from the magnets to an exterior cooling airflow.

15. A method of cooling an outside rotor of a direct-drive wind turbine, which outside rotor carries a plurality of magnets, which method comprises the steps of:
arranging a number of cooling elements of a cooling arrangement according to claim 1 about an exterior of the outside rotor; and
guiding a cooling airflow over the outside rotor to transfer heat from the plurality of magnets to the cooling airflow.

16. A cooling arrangement realized for use with a direct-drive wind turbine with an outside rotor carrying a plurality of magnets, which cooling arrangement comprises a number of exterior cooling elements arranged about an exterior of the outside rotor, wherein a cooling element is configured to guide a cooling airflow over the outside rotor and to transfer heat from the plurality of magnets to the cooling airflow wherein an exterior cooling element includes a fin mounted directly to an outer surface of the outside rotor and a shroud arranged to direct the cooling airflow over the outer surface of the rotor; and a fan arranged to force convection between a gap defined by the outer surface of the outside rotor and the shroud.

17. A cooling arrangement realized for use with a direct-drive wind turbine with the outside rotor carrying the plurality of magnets as claimed in claim 16, wherein the shroud has a rotary portion.

18. A cooling arrangement realized for use with a direct-drive wind turbine with the outside rotor carrying the plurality of magnets as claimed in claim 17, wherein the shroud has a stationary portion.

19. A cooling arrangement realized for use with a direct-drive wind turbine with the outside rotor carrying the plurality of magnets as claimed in claim 17, wherein the fan is in an exit channel.

* * * * *